United States Patent
Lunden et al.

(10) Patent No.: US 8,478,284 B2
(45) Date of Patent: Jul. 2, 2013

(54) APPARATUS AND METHOD FOR SCHEDULING PACKETS

(75) Inventors: Jari Petteri Lunden, Espoo (FI); Markku Tapani Kuusela, Espoo (FI)

(73) Assignee: Nokia Corporation

( * ) Notice: Subject to any disclaimer, the term of this patent is extended or adjusted under 35 U.S.C. 154(b) by 895 days.

(21) Appl. No.: 12/215,416

(22) Filed: Jun. 27, 2008

(65) Prior Publication Data
US 2009/0247178 A1 Oct. 1, 2009

(30) Foreign Application Priority Data
Mar. 27, 2008 (FI) .................................. 20085250

(51) Int. Cl.
*H04W 74/00* (2009.01)
(52) U.S. Cl.
USPC .................................. 455/452.1; 455/452.2
(58) Field of Classification Search
USPC ... 455/450–453, 464, 509, 561; 370/329–330
See application file for complete search history.

(56) References Cited

FOREIGN PATENT DOCUMENTS
WO WO 2008024321 A2 2/2008

OTHER PUBLICATIONS

Nokia, *Scheduling of LTE DL VoIP*, R2-070006 LTE DL VoIP, 3rd Generation Partnership Project , 3GPP TSG-RAN WG2 Meeting #56bis, Mobile Competence Centre, Sorrento, Italy, Jan. 15-19, 2007.
Alcatel-Lucent, *Persistent DL Scheduling and VoIP*, 3rd Generation Partnership Project, 3GPP TSG RAN WG2 #57 bis, Mobile Competence Centre, Cedex, France, Mar. 26-30, 2007.
Alcatel-Lucent, *Efficient Persistent UL Scheduling and HARQ Feedback Usage*, 3rd Generation Partnership Project, 3GPP TSG RAN WG2 #58bis, Mobile Competence Centre, Cedex, France, Jun. 25-29, 2007.
NEC Group, *Downlink Multiplexing for Persistent and Dynamic Scheduling*, 3rd Generation Partnership Project, TSG-RNA WG1 #52Bis, Mobile Competence Centre, Shenzhen, China, Mar. 31-Apr. 4, 2008.
Extended European Search Report for EP Application No. 09156274. 4, dated Jul. 16, 2009.

*Primary Examiner* — Kashif Siddiqui
(74) *Attorney, Agent, or Firm* — Alston & Bird LLP

(57) ABSTRACT

An apparatus comprising a controller for controlling radio communication using communication resources for user data communication, and control resources for controlling communication on the communication resources, an allocator for allocating mobile stations to use at least one of a dynamic allocation and a persistent allocation, each allocation defining a different utilization of the control resources and communication resources, a monitor for monitoring one or more reallocation conditions associated with at least one of the dynamic allocation and the persistent allocation, and a reallocator configured to reallocate at least one mobile station if one of the one or more reallocation conditions is fulfilled.

22 Claims, 3 Drawing Sheets

APPARATUS AND METHOD FOR SCHEDULING PACKETS

FIELD OF THE INVENTION

Figure 1:
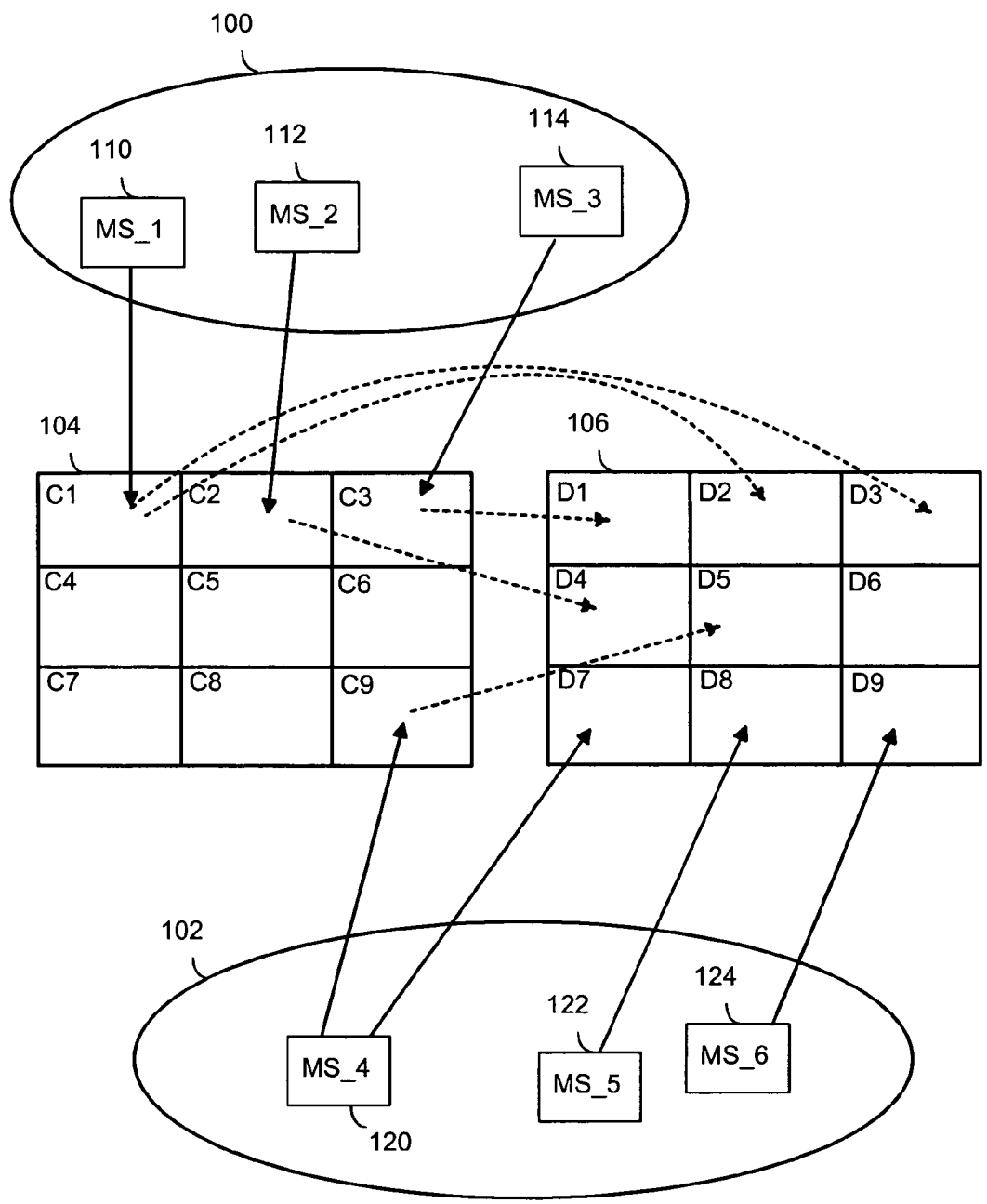

The invention relates to an apparatus, a method, and a computer program product for scheduling packets.

BACKGROUND OF THE INVENTION

In Voice over Internet Protocol (VoIP) in radio communication systems, the principal packet scheduling is fully dynamic, where each user data packet is transmitted with associated control signaling. Fully dynamic packet scheduling is able to fully exploit time and frequency domain scheduling gains with the cost of increased control signaling. This increased control overhead may limit system performance with e.g. VoIP type of traffic, where the size of the transmitted packet is rather small. This, together with strict delay requirements of VoIP traffic, implies that the maximum number of simultaneously scheduled users, given by the number of control channels, is not sufficient to fill the resources available for user data transmission. Thus, part of the transmission resources may be left unused and part of the system capacity may be wasted.

SUMMARY OF THE INVENTION

In one aspect, there is provided an apparatus comprising a controller configured to provide radio communication using communication resources for user data communication, and control resources for indicating allocation of the communication resources, an allocator configured to allocate mobile stations to use at least one of a dynamic allocation and a persistent allocation, each allocation defining a different utilization of the control resources and communication resources, a monitor configured to monitor one or more reallocation conditions associated with at least one of the dynamic allocation and the persistent allocation, and a reallocator configured to reallocate at least one mobile station if one of the one or more reallocation conditions is fulfilled.

In another aspect, there is provided an apparatus comprising means for providing radio communication using communication resources for user data communication, and control resources for indicating allocation of the communication resources, means for allocating mobile stations to use at least one of a dynamic allocation and a persistent allocation, each allocation defining a different utilization of the control resources and communication resources, means for monitoring one or more reallocation conditions associated with at least one of the dynamic allocation and the persistent allocation, and means for reallocating at least one mobile station if one of the one or more reallocation conditions is fulfilled.

In still another aspect, there is provided a method comprising providing communication in a radio system, including communication resources for user data communication, and control resources for indicating allocation of the communication resources, allocating mobile stations to use at least one of a dynamic allocation and a persistent allocation, each allocation defining a different utilization of the control resources and communication resources, monitoring one or more reallocation conditions associated with at least one of the dynamic allocation and the persistent allocation, and reallocating at least one mobile station if one of the one or more reallocation conditions is fulfilled.

In still another aspect, there is provided a computer-readable storage medium encoded with instructions that, when executed by a computer, perform providing communication in a radio system, including communication resources for user data communication, and control resources for indicating allocation of the communication resources, allocating mobile stations to use at least one of a dynamic allocation and a persistent allocation, each allocation defining a different utilization of the control resources and communication resources, monitoring one or more reallocation conditions associated with at least one of the dynamic allocation and the persistent allocation, and reallocating at least one mobile station if one of the one or more reallocation conditions is fulfilled.

DRAWINGS

Figure 2:
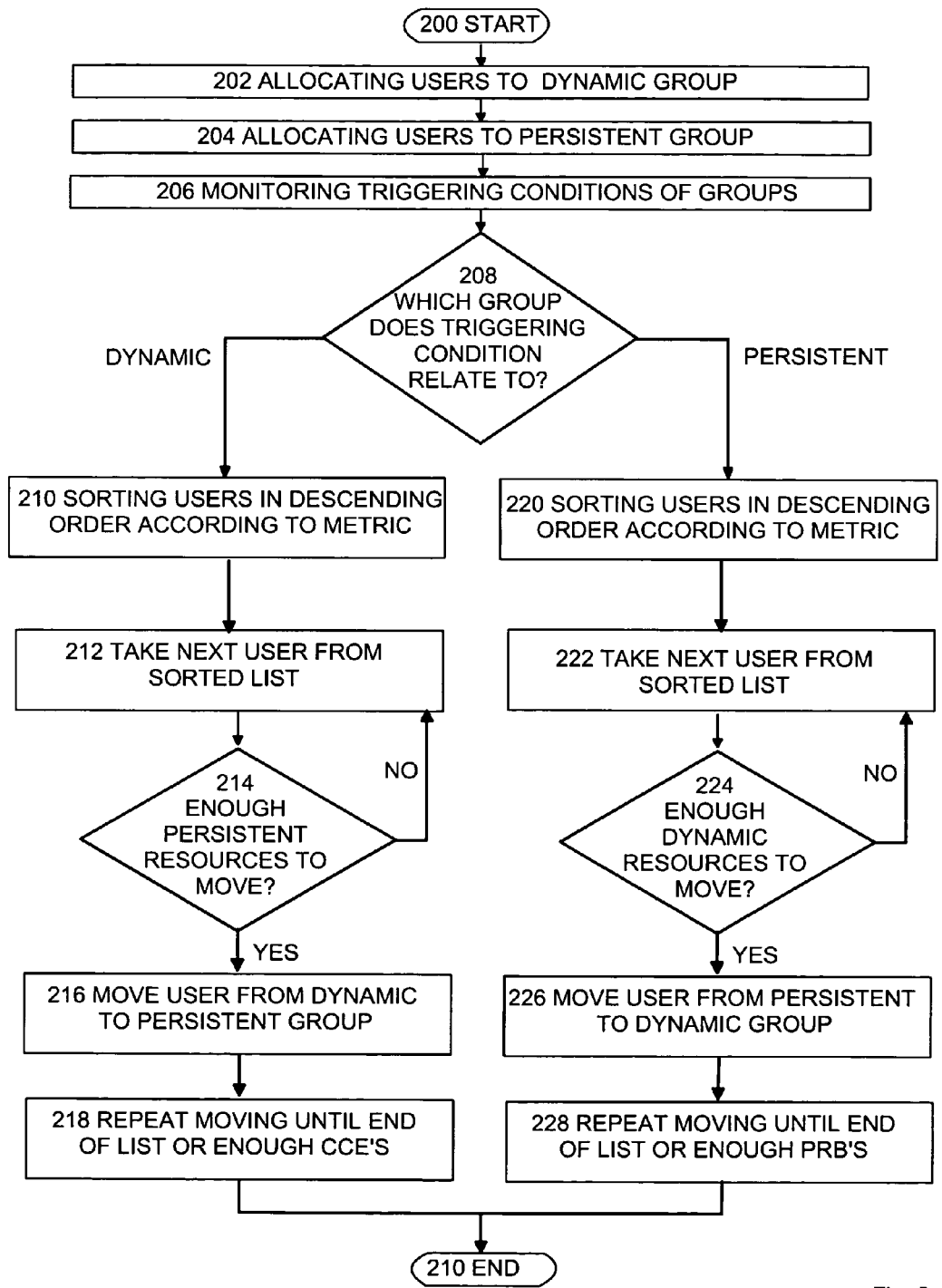
Figure 3:
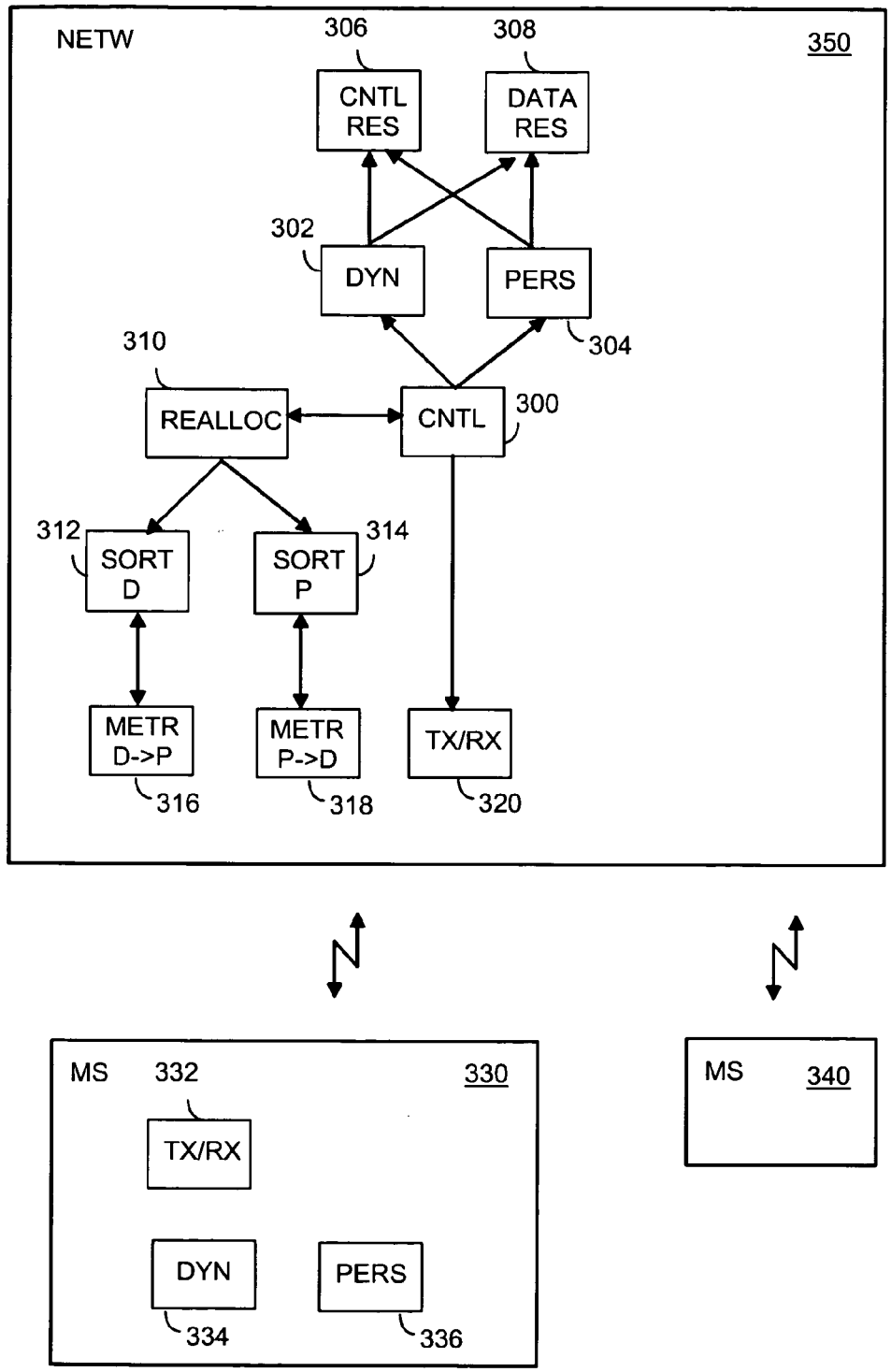

In the following, the invention will be described in greater detail by means of preferred embodiments with reference to the accompanying drawings, in which FIG. 1 shows an embodiment of a radio system;
FIG. 2 shows an embodiment of a method; and
FIG. 3 shows an embodiment of a radio system.

DETAILED DESCRIPTION OF EMBODIMENTS

FIG. 1 shows an embodiment of a radio system. The radio system may be a 3GPP LTE (Long Term Evolution) radio system, for instance. LTE is here mentioned only as an example and the embodiments may be applied to other radio systems as well. As another example, the embodiments may be applied to a HSDPA (High Speed Downlink Packet Access) radio system, for instance.

In an embodiment, the invention may be applied to scheduling and allocating of resources for VoIP users. VoIP is here mentioned only as an example, and the embodiments may be applied to any other packet based traffic types as well. The resources to be allocated or scheduled may be uplink or downlink communication resources. The resources may, for instance, be characterized by a combination of frequency and time, such as in LTE, or by a combination of an OSVF (Orthogonal Variable Spreading Factor) code and time as in the HSDPA system.

FIG. 1 shows six mobile stations MS_1 to MS_6, which may here be assumed to be VoIP users. The figure also shows two resource groups 104 and 106. The first resource group 104 may include control channel resources, such as PDCCH (Physical Downlink Control Channel) resources. Each resource may be characterized by a combination of frequency and time, for instance. FIG. 1 also shows a second group of resources 106, which may include communication resources usable for user data communication. These resources may include DSCH (Downlink Shared Channel) resources, for instance, characterized by a combination of time and frequency.

The mobile stations may be grouped to two groups 100 and 102. The group 100 is here called a dynamic allocation and the group 102 is called a persistent allocation.

When a user, that is a mobile station, is in the dynamic pool 100, a control channel resource from the resource pool 104 and a user data resource from the user data resource pool 106 may be allocated to the user. The allocation of the user data resource may be dynamical for each TTI (transmit time interval). This is highlighted by reference to MS_1 (110), which has an allocated control channel resource C1. In a first TTI, C1 points to a user data resource D3 in the user data resource pool 106. In the next TTI, C1 points to another user data resource D2. Thus, for each TTI, C1 may point to a different user data resource, but this is not necessarily the case but the same resource may be allocated in succeeding TTI's. Furthermore, the control channel resource allocated to a user may be different in succeeding TTI's. That is, in a first TTI, a control channel resource C1 may be allocated to a user and in a subsequent second TTI, a control channel resource C2 may be allocated to the user. Correspondingly, a control channel resource C2 has been allocated to MS_2 (112), and C3 has been allocated to MS_3 (114). In the depicted TTI, C2 points to a frequency-time combination illustrated by D4, and C3 points to a frequency-time combination illustrated by D1.

The persistent allocation 102 includes three mobile stations 120 to 124. Persistent allocation means here that a user data resource may be used by a user without an associated control resource. In an embodiment, a user data resource may be allocated to a user in each TTI. In another embodiment, a user data resource may be allocated in each other TTI, for instance. In the other TTI's, the user may be allocated dynamically, or have no allocation at all, for instance.

In FIG. 1, each of the mobile stations 120 to 124 has a persistent resource allocated from the resource pool 106. This means that the mobile station has a user data resource from pool 106 allocated without associated control signaling. The mobile station may use the same resource in a plurality of successive TTI's, for instance. Because the resource to be used is known to the mobile station, the mobile station needs no resource from the control channel resource pool 104 to be used for this indication.

In FIG. 1, MS_4 is shown to a have a persistent resource D7, which is to be used for user data transmission/reception. For data packet retransmissions and SID transmissions, however, the dynamic approach may be used. For this purpose, in a certain TTI, C9+D5 may be allocated for MS_4.

FIG. 2 shows an embodiment of a method. The method relates to a radio system, such as a packet radio system having user data communication resources and control channel resources for controlling the data transmission/reception on the user data communication resources.

In 202 and 204, the users are allocated according to a dynamic or a persistent allocation. Originally, all the users may be allocated dynamically but if the control channel resources come to an end or are about to come to an end or some other relevant criterion is fulfilled, users may be moved from dynamic to persistent allocation.

In an embodiment, persistent allocation may be applied as a talk-spurt based scheduling scheme. In the talk-spurt based persistent scheduling scheme, at the beginning of a talk spurt a dedicated time/frequency resource is persistently allocated for a user from the user data resource pool. During the persistent allocation, first transmissions of data (before retransmissions) may be done without associated control channel signaling, no control channel resources need to be allocated for the user for indicating the allocation of the user data resource for the first transmissions. At the end of the talk spurt when a silent period starts, the persistently allocated transmission resources are released. Re-transmissions and SID (Silence insertion descriptor) frames may be scheduled dynamically for a user even if the user is allocated persistently. Thus, retransmissions may be carried out by using a control channel resource and an associated user data channel resource.

The dynamic and persistent packet scheduling methods may be used in combination. A dynamic pool of users scheduled dynamically and a persistent pool of users scheduled in a manner similar to that used with talk-spurt based scheduling may be maintained.

In an embodiment, a mechanism is provided for moving users from the dynamic to the persistent pool, and vice versa, whenever considered necessary from point of view of the system performance.

A triggering condition, or a reallocation condition, may be monitored continuously as shown by 206 in FIG. 2. The triggering condition may be associated with one of the dynamic group or the persistent group or the triggering conditions of both groups may be monitored continuously.

A triggering condition associated with the dynamic pool may be the number of used or unused control channel elements (CCE), for instance. When the triggering condition with regard to the dynamic group is fulfilled, moving a user from the dynamic pool to the persistent pool may be initiated. A triggering condition associated with the persistent pool may be that the user data transmission resources are coming to an end, or a threshold value depicting the percentage of reserved resources has been exceeded. In such a case, moving one or more users to the dynamic pool may be initiated.

Moving one or more users from the dynamic to the persistent pool may take place whenever a need exists to reduce the number of occupied control channel elements. In an embodiment, such a need may arise when the performance is control channel limited, that is eNodeB measurements indicate that user data resources are not occupied, that is there are unscheduled frequency resources, but the control channels resources are on average all taken. Furthermore, a need to change a dynamic allocation to a persistent allocation for at least one mobile station may arise when users assuming traffic relying on dynamic scheduling (e.g. best effort (BE) traffic) are entering to the system and some CCE's should be released in order to serve such users.

Moving the users from the persistent to the dynamic pool may take place when a need exists to optimize user data resource utilization. If user data resources are mainly occupied, but control overhead is below a predefined limit, it may be beneficial to move one or more users from the persistent to the dynamic pool. In this way, it may be possible to utilize transmission resources more efficiently, because the dynamic resource allocation is better from the point of view of user data resource consumption. In another embodiment, the persistent allocation of a user may turn out to be undesired from the point of view of user Quality of Service (QoS) in that a block error rate (BLER) is too low or too high. In still another embodiment, the persistent allocation may be non-optimal due to jitter in VoIP packet arrival, whereby the user fails to use many of the persistent resources. In these cases, a procedure for moving a user back to the dynamic pool might be initiated.

In 208, it is evaluated which group the triggering condition relates to, that is whether the moving of one more mobile stations should be from the dynamic to the persistent pool or vice versa. As a simple example, a triggering condition may be a percentage of available/reserved resources in comparison to all resources. Thus, for instance, in the case of the dynamic group, a triggering condition may be a predetermined threshold value depicting the percentage of the reserved CCE's with respect to all CCE's. If the percentage of the reserved CCE's exceeds the predetermined threshold value, the triggering condition is considered as fulfilled.

If the fulfillment of the triggering condition is associated with the dynamic pool, the method branches to 210 to 218. If the triggering condition is associated with the persistent groups, the method branches to 220 to 228.

The procedure to move users from dynamic to persistent pool aims to reduce the control channel overhead or resource consumption with a minimal increase to the average data resource consumption, which may be measured as a Physical Resource Blocks (PRB), for instance. This may be achieved by transferring one or more users from the dynamic to the persistent pool in such a way that the ratio of the amount of freed control channel resources to the required size of the persistent allocation in RB's, if a user would moved from the dynamic pool to the persistent pool, is maximized.

First, users in the dynamic pool may be sorted according to 210 in FIG. 2 in descending order according to a user-specific metric (1).

$$\chi_{D2P} = \frac{\text{SAVINGS\_IN\_CONTROL}}{\text{COST\_IN\_DATA}} = \frac{f(S_{cce})}{g(C_{RA})}, \quad (1)$$

where $f$ and $g$ are increasing functions on $S_{cce}$ and $C_{RA}$, respectively. Here $S_{cce}$ may denote the achieved savings in control channel consumption in terms of CCEs, and $C_{RA}$ may be the cost in terms of used user data transmission resources (in terms of RBs), when a user is moved from dynamic to persistent pool.

Savings in control channel consumption, $S_{cce}$, may be defined as a difference $O_{CCE}^{Pers}-O_{CCE}^{Dyn}$, where $O_{CCE}^{Pers}$ and $O_{CCE}^{Dyn}$ are the estimated number of average consumed control channel elements CCEs required for a user for persistent allocation and dynamic scheduling, respectively. The control channel element consumption may be per VoIP packet and may include the impact of retransmissions. eNodeB may estimate these on the basis of the received Channel Quality Indicator (CQI) reports and expected BLER of the persistent allocation, or from the actual realized CCE usage when the user has been scheduled dynamically.

Similarly, the cost in used transmission resources, $C_{RA}$, may be defined as the difference $RA_{Pers}-RA_{Dyn}$, where $RA_{Pers}$ is the number of virtual/physical resource blocks that would be allocated to a user if moved to the persistent pool, and $RA_{Dyn}$ is the number of resource blocks per VoIP packet that is on average needed to schedule the user dynamically.

Although equation (1) illustrates that the metric takes the condition in both groups into account, the metric may be based on one group only. That is, users may be sorted/ranked on a criterion based on the dynamic or the persistent group only.

When the users are sorted in order of priority/superiority according to the metric (1), the method may first consider the highest priority user in the sorted list, which is illustrated by 212 in FIG. 2.

In 214, it is checked whether enough transmission resources are available to make a persistent resource allocation to the selected user. If this is the case, the user may be moved from a dynamic pool to a persistent pool, and a persistent resource allocation for the user may be carried out as shown in 216. not enough resources are available for the first user, the first user is skipped and the procedure is repeated for the second user in the list, illustrated by a returning arrow from 214 to 212.

Moving of users from the dynamic pool to the persistent pool may be repeated 218 until the whole list has been processed or enough control channel resources have been released.

When considering moving users from the persistent pool to the dynamic pool, the aim may be to reduce average PRB consumption of the currently served users, so that more traffic can be sent with the available transmission resources. This can be achieved by moving selected users from the persistent pool to the dynamic pool in such a way that the amount of released transmission resources (in terms of RBs) per increased control channel overhead is maximized.

First, the users in the persistent pool may be sorted 220 in descending order according to the metric (2).

$$\chi_{P2D} = \frac{\text{SAVINGS\_IN\_DATA}}{\text{COST\_IN\_CONTROL}} = \frac{u(S_{RA})}{v(C_{CCE})}, \quad (2)$$

where $u$ and $v$ are increasing functions on $S_{RA}$ and $C_{CCE}$, respectively. Here $S_{RA}$ denotes the achieved savings in transmission resource consumption in terms of RBs, and $C_{CCE}$ the cost in terms of control channel consumption in terms of CCEs, when a user would be moved from the dynamic pool to the persistent pool.

The savings in the user data transmission resource consumption, $S_{RA}$, may be defined as the difference $RA_{Pers}-RA_{Dyn}$ whereas the cost in control channel consumption, $C_{CCE}$, may be defined as the difference $O_{CCE}^{Dyn}-O_{CCE}^{Pers}$. Here $O_{CCE}^{Pers}$, $O_{CCE}^{Dyn}$, $RA_{Pers}$, $RA_{Dyn}$ are as explained above in conjunction with the dynamic-to-persistent metric. When considering moving a user from the persistent pool to the dynamic pool, the average persistent PRB consumption may be estimated e.g. from average realized consumption, taking into account also retransmissions, and the dynamic consumption may be estimated based on the received CQI information, for instance. Control channel element consumption for both cases may be estimated from the realized consumption and the respective BLER estimate derived from CQI reports.

When the users have been sorted, the highest priority user may first be taken 222 into consideration. It may be checked 224 if enough free control channel resources are available. The estimated number of needed control channel elements for a user may at most be the number of free CCEs. If enough control channel resources exist, the user may be scheduled dynamically 226, that is moved from the persistent allocation to the dynamic allocation. The persistently allocated transmission resources of this user may be released and the user may be moved to the dynamic pool. If the amount of control channel resources is not sufficient, the first user is skipped and the above procedure is repeated for the next user in the list.

Moving of the users from the persistent pool to the dynamic pool may be repeated 228 until the end of the list is faced, until the control channel overhead has reached the maximum value, until the control channel overhead has reached the maximum value minus some threshold value, which threshold value may be zero, or until enough transmission resources (in terms of resource blocks) have been released, for instance.

Although FIG. 2 shows the method steps in succeeding steps, they may also be carried out at least partly in parallel, continuously or in different order. For instance, a priority order may continuously be provided for the mobile stations in the dynamic and the persistent allocation. Furthermore, triggering conditions, that is reallocation conditions, may be continuously monitored with respect to the allocations.

FIG. 3 shows an embodiment of a radio system. The radio system includes a radio network NETW 350, and mobile stations MS's 330, 340 having a communication link with the radio network 350. The radio network may include base stations or nodeB's providing a radio communication link with the mobile stations. The network may also include radio network controllers for controlling the base stations. Furthermore, the network may include functionality for providing data communication with external networks, such as the Internet or PSTN (Public Switched Telephony Network) networks, for instance. In FIG. 3, the radio network has been illustrated as one entity and the exact division of functionality between the base stations and the base station controllers, for instance, has not been shown. The embodiments of the invention may correspondingly be implemented at least partly distributed over various network elements. Some of the functionality may be implemented in base stations, and some in a base station controller, for instance.

The radio network includes a controller CNTL 300 for coordinating and controlling the functionality in the network. The network includes control resources, such as control channel resources CNTL RES 306 and communication resources such as user data resources DATA RES 308. The controller may be responsible for providing radio communication using the communication and control resources.

The user data resources may be shared channel resources, for instance, defined by a frequency-time combination. Alternatively, the user data resources may be identified by OSVF code and time combination, for instance. The control channel resources may be applicable to indication of the allocation of the user data resources, such as to indicate which frequency-time combination, for instance, has been allocated for a user.

In addition to the resource assignment, the control channel signaling may also indicate the used modulation and coding scheme (MCS), mobile station identity, and the duration of the resource assignment, for instance.

The radio network may also include a table or a database for storing mobile station identities belonging to the dynamic allocation DYN 302 and the persistent allocation PERS 304. Dynamically allocated 302 mobile stations may use the control channel resources 306 and user data resources 308. Persistently allocated 304 mobile stations may use the user data resources 308 for user data transmission/reception, and both the control channel resources 306 and user data resources 308 for data packet retransmissions.

The radio network may also include an allocator and reallocator REALLOC 310 for coordinating initial allocation and reallocation of mobile stations. Reallocation means allocating dynamically allocated users persistently and vice versa.

The allocator may allocate mobile stations to use at least one of a dynamic allocation and a persistent allocation, each allocation defining a different utilization of the control resources and communication resources. A mobile station may use one of the allocations, or both of them. A mobile station may use both of the allocations when a mobile station is persistently allocated but uses dynamic allocation for retransmissions, for instance. Different utilization of communication resources and control resources means, for instance that in the dynamic allocation the allocated communication resource is indicated for each TTI, whereas in the persistent allocation no indication of the communication resource on the control channel is needed during use of the communication resource.

The reallocator 310 may be connected to the dynamic and persistent groups 302, 304 and include a monitor configured to monitor if a reallocation condition associated with these groups is fulfilled. A reallocation condition may be, with respect to the dynamic group, if there is a shortage of CCE's, for instance. A threshold value may be provided for occupied CCE's, and if the number of occupied CCE's exceeds the threshold value, the reallocation condition is considered fulfilled. Alternatively, the reallocation condition may be the number of free CCE's. If the number of free CCE's drops below the reallocation condition, the reallocation condition is considered fulfilled. With respect to the persistent allocation, a reallocation condition may be the number of occupied/free PRB's. The reallocation condition is fulfilled when the number of PRB's is above/below the reallocation conditions.

The network may further include a sorting unit SORT D 312 for sorting the mobile stations in the dynamic group 302. The mobile stations may be sorted in a descending order, for instance, according to a predefined metric. Calculations for the metric may be provided in the calculation unit METR D→P 316. In an embodiment, the metric takes into account, for each mobile station, only the condition in the destination group, that is the persistent group. In another embodiment, the metric takes into account only the condition in the originating group, that is the dynamic group.

When considering reallocation from the dynamic group to the persistent group, the reallocator 310 may also check if there are sufficiently resources in the persistent allocation to serve the mobile station(s).

The reallocator 310 may perform the reallocation iteratively. First, the highest priority mobile station that is the first in the sorted list kept in 312 is considered. If the persistent group has enough resources to serve the first mobile station, it is reallocated to the persistent group. In the reallocation, the control channel may provide one bit, for instance, to indicate that the communication resource indicated by the control channel is persistently allocated until it is released. The mobile station may itself notice release of the persistent allocation, or the network may indicate it to the mobile station by signaling, for instance. In this reallocation, the CCE(s) used by the first mobile station are released, and a persistent resource is reserved from the pool of user data resources 308. If the reallocation condition is no longer fulfilled, the reallocation process may be stopped. However, if the reallocation condition is still in force, the process may proceed to the second mobile station in the sorted list. This may continue until the reallocation condition is no longer fulfilled. If the destination allocation is incapable of serving a certain mobile station, this mobile station may be skipped.

The network may further include a sorting unit SORT P 314 for sorting the mobile stations in the persistent group 302. The mobile stations may be sorted in a descending order, for instance, according to a predefined metric. Calculations for the metric may be provided in the calculation unit METR P→D 318. In an embodiment, the metric takes into account, for each mobile station, only the condition in the destination group, that is, the dynamic group. In another embodiment, the metric takes into account only the condition in the originating group, that is, the persistent group. In still another embodiment, the metric takes into account the condition in the originating group and in the destination group. For instance, the metric may take into account the savings in the persistent group and the cost in the dynamic group if the mobile station is to be reallocated.

When considering reallocation from the persistent group to the dynamic group, the reallocation unit may also check if there are sufficiently resources in the dynamic allocation to serve the mobile station(s).

The reallocation unit 310 may perform the reallocation iteratively. First, the highest priority mobile station that is the first in the sorted list kept in 314 is considered. If the dynamic allocation has enough resources to serve the first mobile station, it is reallocated according to the dynamic allocation. In this reallocation, the persistently allocated resources used by the first mobile station are freed, and a control channel resource is reserved from the pool of control channel resources 306. If the reallocation condition is no more fulfilled, the process may be stopped. However, if the reallocation condition is still in force, the process may be continued to the second mobile station in the sorted list. This may be continued until the reallocation condition is no more fulfilled. In the event the destination allocation is not capable of serving a certain mobile station, this mobile station may be skipped.

The network may further include a communication unit 320 for providing radio communication links towards the mobile stations, and other needed communication interfaces, such as those towards connected data networks.

FIG. 3 shows two mobile stations 330 and 340 having a bi-directional radio communication link with the network 350. The mobile station 330 has been illustrated more in detail with respect to the functionality disclosed in the above embodiments. The mobile station may include an entity DYN 334 for coordinating participation in the dynamic allocation. That is, the mobile station may read from a control channel a reference to the user data resource, and use the indicated user data resource for user data communication. The mobile station may also include an entity PERS 336 for coordinating participation in the persistent allocation. Then, the mobile station may use a persistently allocated resource for user data communication, and use dynamic allocation only for retransmission and SID communication, for instance. For radio communication of the mobile station, a transceiver 332 is provided.

In an embodiment, an apparatus may be provided, which apparatus may be a chip, a processor, a base station, a base station controller or some other network element, for instance. In an embodiment, the communication resources are shared channel resources defined by a combination of frequency and time, and the control resources are control channel resources configured to indicate the frequency-time combination allocated to a mobile station on the shared channel. That is, the control channel resources may indicate which shared channel resource is allocated to a particular mobile station. The resource may be an uplink or a downlink resource.

In an embodiment, the allocator may be configured to allocate to a mobile station, in the dynamic allocation, at least one control resource and a dynamic communication resource indicated by the control resource. Dynamically allocated mobile stations may thus use both control and communication resources. The communication resource may be different for each communication frame, for instance.

The allocator may be configured to allocate in the persistent allocation the same communication resource to a mobile station in at least two successive radio frames without continuous associated control resource allocation. Thus, in the persistent allocation, there may be no need for allocation of control resources. Initially, the indication of the persistent communication resource may be provided on the control channel, but there after the control resource may be released and the mobile station may continue communication on the user data channel without any associated control resource.

The reallocation condition associated with the dynamic group may be the number of reserved control resources exceeding a predetermined threshold value. Alternatively, the number of available resources may fall under a predetermined threshold value. In such cases, the reallocator is configured to allocate, if the reallocation condition is fulfilled, at least one mobile station from the dynamic allocation to the persistent allocation.

The reallocation condition associated with the persistent group may be the number of reserved communication resources exceeding a predetermined threshold value. Alternatively, the number of available resources may fall under a predetermined threshold value. The reallocator may then be configured to allocate, if the reallocation condition is fulfilled, an allocation of at least one mobile station from the persistent allocation to the dynamic allocation.

The reallocator may be configured to reallocate a mobile station whose reallocation optimises a reallocation metric for optimizing one or more of savings to an allocation, which the mobile station is moved from, and cost to an allocation which the mobile station is moved to. The reallocation metric may be in the form of a cost function, where both the condition in the originating pool (which the mobile station is moved from) and the destination pool (which the mobile station is moved to) may be taken into account.

The reallocator may be configured to sort the mobile stations into an order of priority according to the reallocation metric, reallocate a mobile station having as high a priority as possible and being able to be served in the allocation which the mobile station would be moved to, and repeat reallocating mobile stations in the order of priority as long as the reallocation condition is no more fulfilled. Thus, if a reallocation condition is fulfilled, one or more mobile stations may be reallocated. Reallocations may be carried out as long as the reallocation condition is no more fulfilled, for instance. For the reallocations, the mobile stations may be sorted in an order of priority such as superiority according to the metric. Moving of the highest priority user may first be considered. In the destination groups has enough resources the serve the highest priority user, it is moved. If not, the next highest user is considered and so on.

The reallocator may be configured to reallocate from the dynamic allocation to the persistent allocation a mobile station having a talk-spurt beginning or ongoing. Beginning of a talk-spurt may be an indication that the user may need the resource for some while. In such a case, a persistent allocation may be suitable.

The allocator may be configured to allocate mobile stations starting communication or becoming active according to the dynamic allocation. It is feasible to first allocate a user dynamically and then, if need be, reallocate it later on persistently.

A method and a computer program product implementing the method and carrying out the functionality of the apparatus may be provided. The embodiments may be implemented by software, hardware, or a combination thereof. The embodiments may be implemented on one or more processors usable in base stations or base station controllers, for instance. The disclosed functionality in various embodiments may be implemented by way of a computer program product encoding a computer program of instructions for executing a computer process of the above-described method. The computer program product may be implemented on a computer program distribution medium. The computer program distribution medium may be any of the known ways of distributing software, such as a computer readable medium, a program storage medium, a record medium, a computer readable memory, a computer readable software distribution package, a computer readable signal, a computer readable telecommunication signal, and a computer readable compressed software package. Alternatively, some of the functionality may be implemented by hardware, such as ASIC (Application Specific Integrated Circuit) or by a combination of hardware and software.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising at least one processor and at least one memory including computer program instructions, the at least one memory and the computer program instructions configured to, with the at least one processor, direct the apparatus at least to:

control radio communication using communication resources for user data communication and control resources to indicate assignment of the communication resources;

cause allocation of mobile stations to use at least one of a dynamic allocation and a persistent allocation, wherein each allocation defines a different utilization of the control resources and the communication resources in a radio system;

cause monitoring of one or more reallocation conditions associated with at least one of the dynamic allocation and the persistent allocation; and cause reallocation of at least one mobile station in an instance in which at least one of the one or more reallocation conditions is fulfilled;

wherein the reallocation condition associated with the persistent allocation is a number of reserved communication resources in the radio system exceeding a predetermined threshold value, the predetermined threshold value being based on system performance, and wherein the apparatus is further directed to cause reallocation, in an instance in which the reallocation condition associated with the persistent allocation is fulfilled, of at least one of the mobile stations from the persistent allocation to the dynamic allocation.

2. The apparatus according to claim 1, wherein the communication resources are shared data channel resources, and the control resources are control channel resources configured to indicate the communication resource assignment allocated to one of the mobile stations on a shared data channel.

3. The apparatus according to claim 1, wherein the apparatus is further directed to cause allocation, to at least one of the mobile stations in the dynamic allocation, of at least one control resource and a dynamic communication resource indicated by the control resource.

4. The apparatus according to claim 1, wherein the apparatus is further directed to cause allocation, in the persistent allocation, of the same communication resource to at least one of the mobile stations without associated control resource allocation during use of the allocated communication resource.

5. The apparatus according to claim 1, wherein the reallocation condition associated with the dynamic allocation is a number of reserved control resources exceeding a predetermined threshold value and wherein the apparatus is further directed to cause reallocation, in an instance in which the reallocation condition associated with the dynamic allocation is fulfilled, of at least one of the mobile stations from the dynamic allocation to the persistent allocation.

6. The apparatus according to claim 1, wherein the apparatus is further directed to cause reallocation of at least one of the mobile stations, the reallocation optimizing a reallocation metric to optimize at least one of savings to an allocation that the at least one mobile station is moved from, and cost to an allocation that the at least one of the mobile stations is moved to.

7. The apparatus according to claim 6, wherein the apparatus is further directed to:

sort the mobile stations in order of priority according to the reallocation metric;

cause reallocation of at least one of the mobile stations to an allocation having as high a priority as possible and being able to be served in the allocation that the at least one mobile station would be moved to; and cause repeated reallocation of the mobile stations in the order of priority until the reallocation condition is no longer fulfilled.

8. The apparatus according to claim 1, wherein the apparatus is further directed to cause reallocation, from the dynamic allocation to the persistent allocation, of one of the mobile stations having a talk-spurt beginning or ongoing.

9. The apparatus according to claim 1, wherein the apparatus is further directed to cause allocation of the mobile stations starting communication or having a talk-spurt beginning according to the dynamic allocation.

10. An apparatus comprising:

controlling means for controlling radio communication using communication resources for user data communication and control resources to indicate allocation of the communication resources;

allocating means for causing allocation of mobile stations to use at least one of a dynamic allocation and a persistent allocation, wherein each allocation defines a different utilization of the control resources and the communication resources in a radio system;

monitoring means for causing monitoring of one or more reallocation conditions associated with at least one of the dynamic allocation and the persistent allocation; and reallocating means for causing reallocation of at least one mobile station in an instance in which at least one of the one or more reallocation conditions is fulfilled;

wherein the reallocation condition associated with the persistent allocation is a number of reserved communication resources in the radio system exceeding a predetermined threshold value, the predetermined threshold value being based on system performance, and wherein the apparatus further comprises means for causing reallocation, in an instance in which the reallocation condition associated with the persistent allocation is fulfilled, of at least one of the mobile stations from the persistent allocation to the dynamic allocation.

11. The apparatus according to claim 10, wherein the reallocation condition associated with the dynamic allocation is a number of reserved control resources exceeding a predetermined threshold value, and wherein the reallocating means causes reallocation, in an instance in which the reallocation condition associated with the dynamic allocation is fulfilled, of at least one mobile station from the dynamic allocation to the persistent allocation.

12. A method, comprising:

controlling radio communication using communication resources for user data communication and control resources to indicate allocation of the communication resources;

causing allocating of mobile stations to use at least one of a dynamic allocation and a persistent allocation, wherein each allocation defines a different utilization of the control resources and the communication resources in a radio system;

causing monitoring of one or more reallocation conditions associated with at least one of the dynamic allocation or the persistent allocation; and causing reallocating of at least one mobile station in an instance in which at least one of the one or more reallocation conditions is fulfilled;

wherein the reallocation condition associated with the persistent allocation is a number of reserved communication resources in the radio system exceeding a predetermined threshold value, the predetermined threshold value being based on system performance, and wherein the method further comprises causing reallocating, in an instance in which the reallocation condition associated with the persistent allocation is fulfilled, of at least one of the mobile stations from the persistent allocation to the dynamic allocation.

13. The method according to claim 12, wherein the communication resources are shared data channel resources, and the control resources are control channel resources indicating the communication resource assignment allocated to one of the mobile stations on a shared data channel.

14. The method according to claim 12, wherein in the dynamic allocation of at least one control resource and a dynamic communication resource indicated by the control resource is allocated to one of the mobile stations.

15. The method according to claim 12, wherein in the persistent allocation, the same communication resource is allocated to one of the mobile stations without associated control resource assignment during use of the communication resource.

16. The method according to claim 12, wherein a reallocation condition associated with the dynamic allocation is a number of reserved control resources exceeds a predetermined threshold value, and wherein causing reallocating further comprises causing reallocating, in an instance in which the reallocation condition associated with the dynamic allocation is fulfilled, of at least one mobile station from the dynamic allocation to the persistent allocation.

17. The method according to claim 12, wherein causing reallocating further comprises causing reallocating of one of the mobile stations, the reallocation optimizing a reallocation metric to optimize at least one of savings to an allocation that the one of the mobile stations is moved from, and cost to an allocation that the one of the mobile stations is moved to.

18. The method according to claims 17, wherein causing reallocating further comprises:
- sorting the mobile stations in order of priority according to the reallocation metric;
- causing reallocating of one of the mobile stations to an allocation having as high a priority as possible and that would be able to be served in the allocation that the one of the mobile stations would be moved to; and
- causing repeated reallocating of the mobile stations in the order of priority until the reallocation condition is no longer fulfilled.

19. The method according to claim 12, wherein causing reallocating further comprises causing reallocating, from the dynamic allocation to the persistent allocation, of one of the mobile stations having a talk-spurt beginning or ongoing.

20. The method according to claim 12, wherein causing allocating comprises causing allocating of the mobile stations starting communication or becoming active according to the dynamic allocation.

21. A computer-readable non-transitory storage medium encoded with instructions that, when executed by a computer, perform a process, the process comprising:
- controlling radio communication using communication resources for user data communication and control resources to indicate allocation of the communication resources;
- causing allocation of mobile stations to use at least one of a dynamic allocation and a persistent allocation, wherein each allocation defines a different utilization of the control resources and the communication resources in a radio system;
- causing monitoring of one or more reallocation conditions associated with at least one of the dynamic allocation or the persistent allocation; and
- causing reallocating of at least one mobile station in an instance in which at least one of the one or more reallocation conditions is fulfilled;
- wherein the reallocation condition associated with the persistent allocation is a number of reserved communication resources in the radio system exceeding a predetermined threshold value, the predetermined threshold value being based on system performance, and
- wherein the process further comprises causing reallocating, in an instance in which the reallocation condition associated with the persistent allocation is fulfilled, of at least one of the mobile stations from the persistent allocation to the dynamic allocation.

22. The computer-readable storage medium according to claim 21, wherein a reallocation condition associated with the dynamic allocation is a number of reserved control resources exceeding a predetermined threshold value, and wherein causing reallocating further comprises causing reallocating, in an instance in which the reallocation condition associated with the dynamic allocation is fulfilled, of at least one mobile station from the dynamic allocation to the persistent allocation.

* * * * *